(12) United States Patent
Paranjpe et al.

(10) Patent No.: US 11,470,179 B2
(45) Date of Patent: *Oct. 11, 2022

(54) CONTENT DELIVERY NETWORK SYSTEM AND METHOD

(71) Applicant: Margo Networks Private Limited, Mumbai (IN)

(72) Inventors: Rohit Paranjpe, Mumbai (IN); Ripunjay Bararia, Mumbai (IN); Devang Goradia, Mumbai (IN)

(73) Assignee: MARGO NETWORKS PRIVATE LIMITED

( * ) Notice: Subject to any disclaimer, the term of this patent is extended or adjusted under 35 U.S.C. 154(b) by 0 days.

This patent is subject to a terminal disclaimer.

(21) Appl. No.: 17/182,017

(22) Filed: Feb. 22, 2021

(65) Prior Publication Data

US 2021/0289039 A1 Sep. 16, 2021

Related U.S. Application Data

(63) Continuation of application No. 16/355,441, filed on Mar. 15, 2019, now Pat. No. 10,931,778.

(30) Foreign Application Priority Data

Jan. 9, 2019 (IN) .............................. 201921000982

(51) Int. Cl.
*H04L 29/08* (2006.01)
*H04L 12/733* (2013.01)
(Continued)

(52) U.S. Cl.
CPC .......... *H04L 67/568* (2022.05); *H04L 45/122* (2013.01); *H04L 67/55* (2022.05); *H04L 67/63* (2022.05)

(58) Field of Classification Search
CPC ..... H04L 67/26; H04L 67/327; H04L 45/122; H04L 67/2842
See application file for complete search history.

(56) References Cited

U.S. PATENT DOCUMENTS 7,307,956 B2 12/2007 Kaplan et al.
7,505,944 B2 3/2009 Moulart et al.
(Continued)

FOREIGN PATENT DOCUMENTS

CN 103782571 A 5/2014
CN 107852609 A 3/2018
(Continued)

OTHER PUBLICATIONS

Bhardwaj et al., "AppFlux: Taming App Delivery Streaming," Georgia Institute of Technology, pp. 1-14.
(Continued)

*Primary Examiner* — Abdullahi E Salad
(74) *Attorney, Agent, or Firm* — Manatt, Phelps & Phillips, LLP

(57) ABSTRACT

A CDN system and method to provide access and a better user experience based on a novel CDN architecture wherein each edge server may be outside of an Internet data center, may be stationary or mobile, may be intermittently connected to the multi-tiered content delivery network, may be connected to a last mile over Wi-Fi and may be physically located in a place of interest.

14 Claims, 9 Drawing Sheets

(51) Int. Cl.
   *H04L 67/568* (2022.01)
   *H04L 45/122* (2022.01)
   *H04L 67/55* (2022.01)
   *H04L 67/63* (2022.01)

(56) References Cited

U.S. PATENT DOCUMENTS

| | | | |
|---|---|---|---|
| 7,752,258 B2 | 7/2010 | Lewin et al. | |
| 7,860,950 B2 | 12/2010 | Menon et al. | |
| 8,516,529 B2 | 8/2013 | LaJoie et al. | |
| 8,737,357 B2 | 5/2014 | Denny et al. | |
| 8,746,553 B2 | 6/2014 | Burdett | |
| 8,838,480 B2 | 9/2014 | Damola et al. | |
| 8,937,903 B2 | 1/2015 | Bari et al. | |
| 9,001,682 B2 | 4/2015 | Kovvali et al. | |
| 9,003,436 B2 | 4/2015 | Tidwell et al. | |
| 9,105,021 B2 | 8/2015 | Tobin | |
| 9,173,158 B2 | 10/2015 | Varma | |
| 9,282,352 B2 | 3/2016 | McDysan et al. | |
| 9,367,857 B2 | 6/2016 | Linden et al. | |
| 9,374,619 B2 | 6/2016 | Andreasen et al. | |
| 9,419,845 B2 | 8/2016 | Wainner et al. | |
| 9,497,496 B1 | 11/2016 | Corley et al. | |
| 9,565,117 B2 | 2/2017 | Dahod et al. | |
| 9,661,374 B1 | 5/2017 | Erdmann et al. | |
| 9,674,239 B2 | 6/2017 | Wong et al. | |
| 9,871,850 B1* | 1/2018 | Brandwine | H04L 45/306 |
| 9,875,493 B2 | 1/2018 | Nuzzi | |
| 9,904,934 B1 | 2/2018 | Kumar et al. | |
| 9,911,154 B2 | 3/2018 | Baker et al. | |
| 10,009,741 B1 | 6/2018 | Burcham et al. | |
| 10,045,070 B2 | 8/2018 | Markley et al. | |
| 10,049,349 B1 | 8/2018 | Grassadonia et al. | |
| 10,055,721 B1 | 8/2018 | Mocko et al. | |
| 10,097,503 B2 | 10/2018 | Bergman | |
| 10,110,710 B2 | 10/2018 | Cook et al. | |
| 10,134,026 B1 | 11/2018 | Koeppel | |
| 10,142,444 B2 | 11/2018 | Reynolds et al. | |
| 10,200,480 B2 | 2/2019 | Zhang et al. | |
| 10,248,975 B2 | 4/2019 | Garcia-Martinez et al. | |
| 10,470,060 B1 | 11/2019 | Paranjpe et al. | |
| 10,496,979 B2 | 12/2019 | Taveau et al. | |
| 10,554,748 B2 | 2/2020 | Sivasubramanian et al. | |
| 10,630,769 B2 | 4/2020 | Carver et al. | |
| 10,878,404 B2 | 12/2020 | Lu et al. | |
| 10,931,778 B2 | 2/2021 | Paranjpe et al. | |
| 2007/0094691 A1 | 4/2007 | Gazdzinski | |
| 2007/0124662 A1 | 5/2007 | Streuter et al. | |
| 2008/0049630 A1 | 2/2008 | Kozisek et al. | |
| 2008/0215747 A1* | 9/2008 | Menon | H04N 21/23116 709/231 |
| 2008/0222281 A1 | 9/2008 | Dilley et al. | |
| 2009/0030765 A1 | 1/2009 | Cameron et al. | |
| 2009/0094160 A1 | 4/2009 | Webster et al. | |
| 2009/0254661 A1* | 10/2009 | Fullagar | H04N 21/25891 709/226 |
| 2009/0287515 A1 | 11/2009 | Mehta et al. | |
| 2009/0323693 A1 | 12/2009 | Yin et al. | |
| 2010/0074267 A1 | 3/2010 | Ladd | |
| 2011/0082724 A1 | 4/2011 | Le Chevalier et al. | |
| 2011/0087602 A1 | 4/2011 | Rutman | |
| 2011/0314145 A1 | 12/2011 | Raleigh et al. | |
| 2012/0166618 A1 | 6/2012 | Dahod et al. | |
| 2012/0215915 A1* | 8/2012 | Sakata | H04L 67/1021 709/224 |
| 2013/0013688 A1 | 1/2013 | Wang et al. | |
| 2013/0024363 A1 | 1/2013 | Cunescu et al. | |
| 2013/0085864 A1 | 4/2013 | Ahmed et al. | |
| 2013/0107732 A1 | 5/2013 | O'Donnell et al. | |
| 2013/0132504 A1 | 5/2013 | Kohli et al. | |
| 2014/0082126 A1* | 3/2014 | Kim | G06F 21/10 709/213 |
| 2014/0094159 A1 | 4/2014 | Raleigh et al. | |
| 2014/0279047 A1 | 9/2014 | Wang et al. | |
| 2015/0143397 A1 | 5/2015 | Bies | |
| 2015/0237512 A1 | 8/2015 | Chang et al. | |
| 2015/0278796 A1 | 10/2015 | Jiang et al. | |
| 2015/0339318 A1 | 11/2015 | O'Toole et al. | |
| 2015/0341705 A1 | 11/2015 | Rauhe et al. | |
| 2015/0350018 A1 | 12/2015 | Hui et al. | |
| 2016/0042344 A1 | 2/2016 | Thimmana et al. | |
| 2016/0191651 A1* | 6/2016 | Balakrishnan | H04L 67/1097 709/219 |
| 2016/0210622 A1 | 7/2016 | Yang et al. | |
| 2016/0248879 A1* | 8/2016 | Fliam | H04L 67/2885 |
| 2016/0300272 A1 | 10/2016 | Ao et al. | |
| 2016/0337206 A1 | 11/2016 | Bugenhagen et al. | |
| 2017/0032345 A1 | 2/2017 | Gideon et al. | |
| 2017/0155739 A1 | 6/2017 | Ao | |
| 2017/0178090 A1 | 6/2017 | Sarin | |
| 2017/0187837 A1 | 6/2017 | Ao | |
| 2017/0223029 A1 | 8/2017 | Sharma et al. | |
| 2017/0262902 A1 | 9/2017 | Weston et al. | |
| 2018/0068290 A1 | 3/2018 | Xia | |
| 2018/0077258 A1* | 3/2018 | Newton | H04L 67/2842 |
| 2018/0124143 A1 | 5/2018 | Bologh | |
| 2018/0124646 A1 | 5/2018 | Thubert et al. | |
| 2018/0184132 A1* | 6/2018 | Mao | H04L 67/2847 |
| 2018/0184477 A1 | 6/2018 | Paredes et al. | |
| 2018/0232732 A1 | 8/2018 | Rodrigues et al. | |
| 2018/0310279 A1 | 10/2018 | Pathak et al. | |
| 2018/0317067 A1 | 11/2018 | Ameixieira | |
| 2019/0028743 A1* | 1/2019 | He | H04N 21/25825 |
| 2019/0069003 A1* | 2/2019 | Panagos | H04N 21/23103 |
| 2019/0114631 A1 | 4/2019 | Madhu et al. | |
| 2019/0141561 A1 | 5/2019 | Altay et al. | |
| 2019/0166395 A1* | 5/2019 | Li | H04N 21/237 |
| 2019/0268392 A1 | 8/2019 | Santangelo et al. | |
| 2019/0274082 A1 | 9/2019 | Vemuri et al. | |
| 2020/0082404 A1 | 3/2020 | Zhang et al. | |
| 2020/0126062 A1 | 4/2020 | Sun | |
| 2020/0167742 A1 | 5/2020 | Zhai et al. | |
| 2020/0167746 A1 | 5/2020 | Yu et al. | |
| 2020/0220942 A1 | 7/2020 | Paranjpe et al. | |
| 2020/0221365 A1 | 7/2020 | Paranjpe et al. | |
| 2021/0289039 A1 | 9/2021 | Paranjpe et al. | |

FOREIGN PATENT DOCUMENTS

| | | |
|---|---|---|
| EP | 2815541 A1 | 12/2014 |
| WO | WO2008022339 A2 | 2/2008 |
| WO | WO2012000438 A1 | 1/2012 |
| WO | WO2012131287 A1 | 10/2012 |
| WO | WO2013052028 A2 | 4/2013 |
| WO | WO2013123162 A1 | 8/2013 |
| WO | WO2013170864 A1 | 11/2013 |
| WO | WO2015090360 A1 | 6/2015 |
| WO | WO2016043839 A1 | 3/2016 |
| WO | WO2018027984 A1 | 2/2018 |
| WO | WO201858729 A1 | 4/2018 |
| WO | WO2018087275 A1 | 5/2018 |
| WO | WO2018215681 A1 | 11/2018 |

OTHER PUBLICATIONS

Kalva et al., "Techniques for Improving the Capacity of Video-on Dmand Systems," Proceeds of the 29th Annual Hawaii International Conference on System Sciences, (1996), pp. 309-315.

Lai et al., "A Hierarchical Network Storage Architecture for Video-on-Demand Services," IEEE Transactions on Broadcasting, vol. 43:2, (Jun. 1997), pp. 145-154.

Little et al., "Prospects for Interactive Video-on-Demand," Multimedia Communications Laboratory, MCL Technical Report, (Feb. 15, 1994), pp. 1-22.

"How to Auto Switch between WiFi and Mobile the Smart Way," (Dec. 2018), 6 pages, Speedicyhttps://speedify.com/blog.

Kos et al., "CATV Broadband Technologies," EC-VIP-MC 2003, 4th EURASIP Conference, (2003), pp. 829-834.

Alloush et al., "Initial use cases, scenarios and requirements," CogNet, (Nov. 30, 2015), Ver. 0.9, pp. 1-107.

Velasco et al., "A Service-Oriented Hybrid Access Network and Cloud Architecture," p. 8.

(56) References Cited

OTHER PUBLICATIONS

Bulander et al., "Comparison of Different Approaches for Mobile Advertising," The Second IEEE International Workshop on Mobile Commerce and Services (WMCS '05) Jul. 19, 2005, Munich, Germany, IEEE Computer Society, pp. 174-182, 10 pages.

Callejo et al., "Opportunities and Challenges of Ad-based Measurements from the Edge of the Network," © 2017 Association for Computing Machinery. ACM ISBN 978-1-4503-5569-8/17/11, Dec. 1, 2017, Palo Alto, CA, USA © 2017 Association for Computing Machinery. ACM ISBN 978-1-4503-5569-8/17/11, 7 pages. https://doi.org/10.1145/3152434.3152895.

Khan et al., "CAMEO: A Middleware for Mobile Advertisement Delivery," Network Architecture and Design]: Wireless Communication, Research performed by author as a Research Fellow at Singapore Management University, Jun. 25-28, 2013, 13 pages.

Toubiana et al., "Adnostic: Privacy Preserving Targeted Advertising," NYU.edu and stanford.edu, supported by the NSF PORTIA and MURI PRESIDIO projects, 23 pages.

Adi et al., "Secured Multi-Identity Mobile Infrastructure and Offline Mobile-Assisted Micro-Payment Application," WCNC 2004 / IEEE Communications Society, 4 pages.

Kiran et al., "Building Robust m-Commerce Payment System on Offline Wireless Network," Dept. of Electronics & Communication Eng. Sai Vidya Institute of Technology and Electronics & Communication Eng. UVCE, 3 pages.

Van Damme et al., "Offline NFC Payments with Electronic Vouchers," Dept. Electrical Engineering—ESAT/SCD/IBBT-COSIC, Katholieke Universiteit Leuven, Kasteelpark Arenberg 10, 3001 Heverlee-Leuven, Belgium, MobiHeld'09, Aug. 17, 2009, Barcelona, Spain, 6 pages.

\* cited by examiner

CONTENT DELIVERY NETWORK SYSTEM AND METHOD

PRIORITY CLAIMS/RELATED APPLICATIONS

This application is a continuation of and claims priority under 35 USC 120 to U.S. patent application Ser. No. 16/355,441 filed Mar. 15, 2019 that in turn claims priority under 35 USC 119 to Indian Patent Application No. 201921000982 filed Jan. 9, 2019, that entirety of which is incorporated herein by reference.

FIELD

The disclosure relates generally to a system and method for delivering data and an architecture for delivering the data over a last mile, required for a Digital Service (Mobile App/Website/Game/Software Application) to work.

BACKGROUND

The internet and the associated networks used by a consumer/consumer device to access a digital service as shown in FIG. 1 are well known. The internet allows different pieces of content/data required for a digital service to work to be delivered to a device, using a last mile network, like the smartphone shown in FIG. 1. The Internet shown in FIG. 1 is the combination of all physical units distributed across the globe that house all the information in the world. The internet data center is a series of distributed physical units that house all the networking and computing equipment, including redundant and backup components, infrastructure for power supply, data communications connections, environmental controls and various security devices. The CDN infrastructure is a geographically distributed network of servers that are housed in the Internet data center that serve most of the internet content today, especially web objects (text, graphics, scripts), downloadable objects (media files, software, documents), applications, live streaming media, on-demand streaming media and social media whose architecture is well known and whose operation is also known. The Internet, along with the Internet Data Center and the CDN Infrastructure is together termed as the Internet Infrastructure. A Digital Service Provider includes all individuals/companies/entities that use the Internet infrastructure to provide a service to consumers. The consumer Platform is/are mobile apps/websites/any interface through which a user accesses the service of a Digital Service Provider. The telecom Infra is an infrastructure setup by telecom companies that uses licensed wireless frequencies for access to the internet (2G/3G/4G/LTE—collectively, cellular data connections) and the Wi-Fi Infra is the infrastructure setup by Internet service providers to provide broadband/leased line connectivity to access internet or to which Access point/s can be attached to access internet wirelessly using unlicensed frequency.

Using the conventional system shown in FIG. 1, the Service (Mobile App) shown in FIG. 1 works in the following manner. All information made available by a Digital Service Provider is stored/served either through server/s hosted by the Digital Service Provider or through a CDN. Based on data access patterns (what data is being consumed where), the CDN infrastructure caches certain data (a subset of all information) across multiple servers distributed across geographies. The CDN Edge servers (EDGE1, . . . , EDGEn in FIG. 1) are distributed globally and placed inside third party Internet Data Centers distributed globally and data centers operated by Internet Service Providers and Telecom service providers. When a consumer needs to access a Service, the Service needs to access the server/s hosted by the Digital Service Provider and the CDN over a "last mile" which is the data connection between the consumer (the smartphone device for example in FIG. 1) and the Internet Infrastructure (either via an Internet Service Provider, a Telcom Service Provider or any other form of internet connectivity option). The ability of the consumer to access the Service is dependent on the availability of the last mile to the consumer and the consumer experience of the Service is dependent on the reliability and the throughput available on the last mile. More importantly, as the number of users and the data consumption per user increases, the load on the existing Internet Infrastructure, increases exponentially, affecting the experience of the user in densely concentrated areas.

Using a current convention system, accessing the service occurs in the following manner. When a user opens a digital service on a device (like a smartphone), the digital service tries to access the Internet Infrastructure using last mile connectivity available to the device at that moment. The operating system (OS) of the smartphone of the consumer (see FIG. 1) detects the availability of connectivity over a cellular data connection (such as 4G/LTE as shown in FIG. 1) or Wi-Fi. If connectivity is available using only one connection, the OS uses the available connectivity route. If both connectivity options are available, the OS detects which connection offers more stable and faster bandwidth availability and uses that connection to transact data packets, with priority assigned to Wi-Fi. If the above scenario changes at any point, the OS automatically shifts between the two, unless the user manually connects or disconnects from either of the two available options. The user is able to access the service as long as one out of the two connections are available. The user's experience of using the service is dependent on the stability and the available bandwidth on these connections. In an event wherein the user loses connectivity to both connections, the service stops functioning, except any functionality that may be cached on the user device (Downloads in case of a streaming service).

FIG. 2 illustrates how a conventional CDN operates. As shown in FIG. 2, a traditional CDN generally constitutes a multi-tier network of storage and compute servers. It is generally a pull based CDN wherein the response to a unique request by a requestor is cached at a point closest to the requestor—the CDN Edge server, which is the last tier of the CDN network. When a requestor makes a first request for a file, the CDN Edge Server while delivering the file to the requestor also caches the file from the CDN Origin server (as the top of FIG. 2). When the next requestor makes the same request, instead of serving it from the CDN Origin server where the response originated, it is served from the cache (the CDN Edge server) thereby reducing the time taken to serve the request to the next requestor. This action also reduces the total load on the origin server and the internet bandwidth requirement for the origin server. As shown in FIG. 2, a CDN usually employs multiple edge servers distributed geographically to cater to a large number of requestors. The location of the CDN edge servers is usually at the ISP or the telecom infrastructure data centers. When serving cached content, it also amounts to saving the internet bandwidth for the ISP or the telecom. In the typical infrastructure:

1. The CDN origin is connected to the internet
2. The Edge server is connected to the CDN Origin via the internet.

3. The CDN Edge Server is collocated at an ISP/Telecom operator data center and hence, has connectivity to the ISP/Telecom infrastructure.
4. When the Requestor 1 requests a piece of content, the CDN Edge Server while serving the request to Requestor 1 also caches the response on itself
5. When the Requestor 2 requests the same piece of content, it is served directly from the CDN Edge server.

Thus, existing systems have the technical problem that the data/service access is completely dependent on the last mile, without which the CDN or the servers hosted by a Digital Service Provider are unable to deliver any data to the service/requestor. Thus, it is desirable to be able to provide a technical solution that is a novel CDN whose edge devices are closer to each requestor and which is self-sufficient and delivers data to the user using a different connection path, resulting in faster delivery of the data to the user independent of the user's access to a last mile connection.

DETAILED DESCRIPTION OF ONE OR MORE EMBODIMENTS

The disclosure is particularly applicable to digital service (Mobile App/Website/Game/Software Application) installed in a computing device (smartphone/tablet PC/laptop/desktop/smartwatch, etc.) as shown in the Figures being used with a content delivery system and method and it is in this context that the disclosure will be described. It will be appreciated, however, that the disclosed system and method has greater utility, such as to being implemented on various different computing devices that may be used to access content from a digital service provider. In addition, the exemplary CDN system may also be used to optimize the delivery of content or data from other systems and can be used in any system in which it is desirable to optimize the consumer's access and experience of a service. For purposes of this disclosure, the "service" provided to the consumer may be a piece of content (audio, visual and/or textual) or any piece of digital data being delivered to the consumer over any interface including a browser, a mobile application, a software application and the like.

Figure 1:
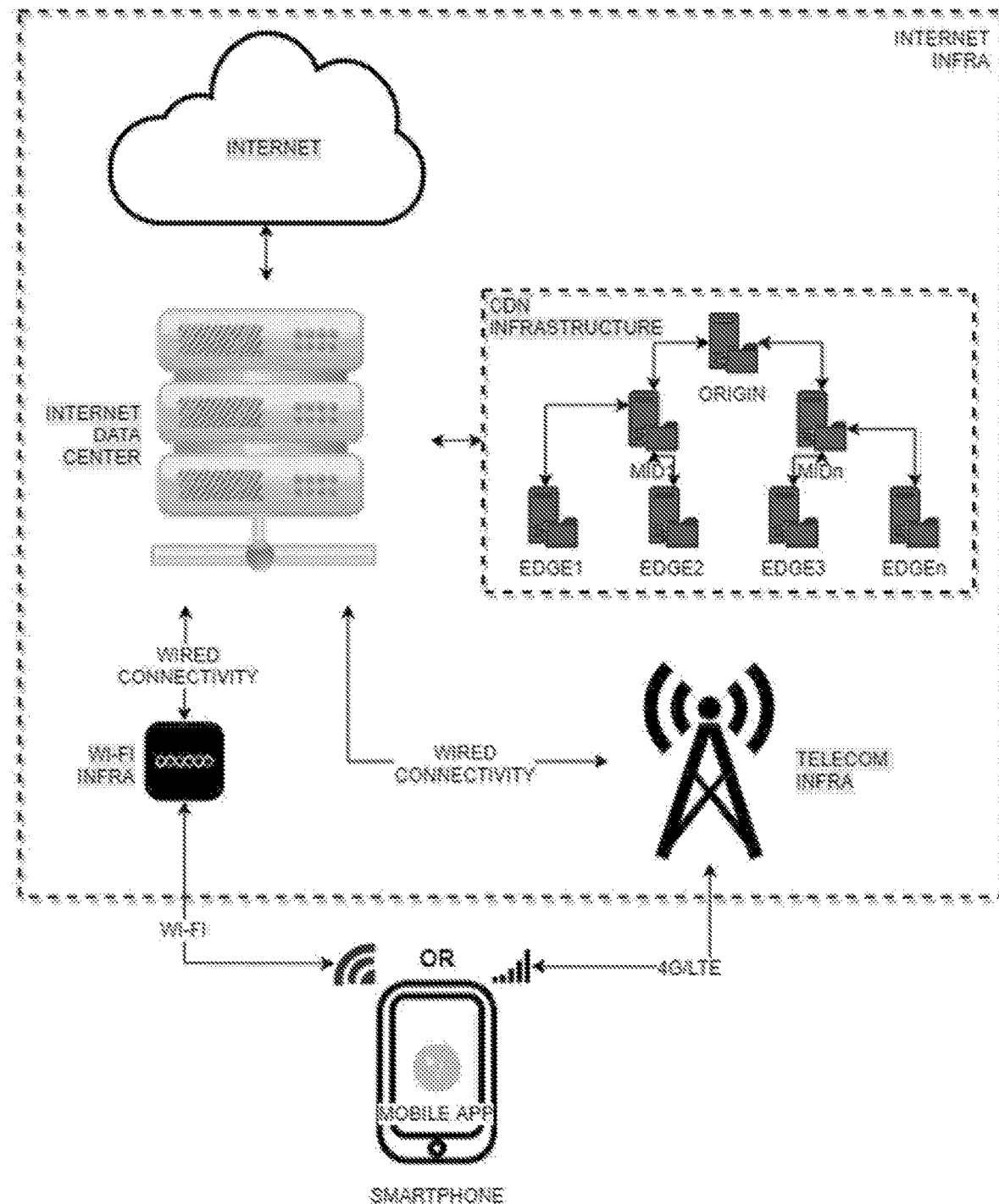
FIG. 1 illustrates how the Internet Infrastructure functions
Figure 2:
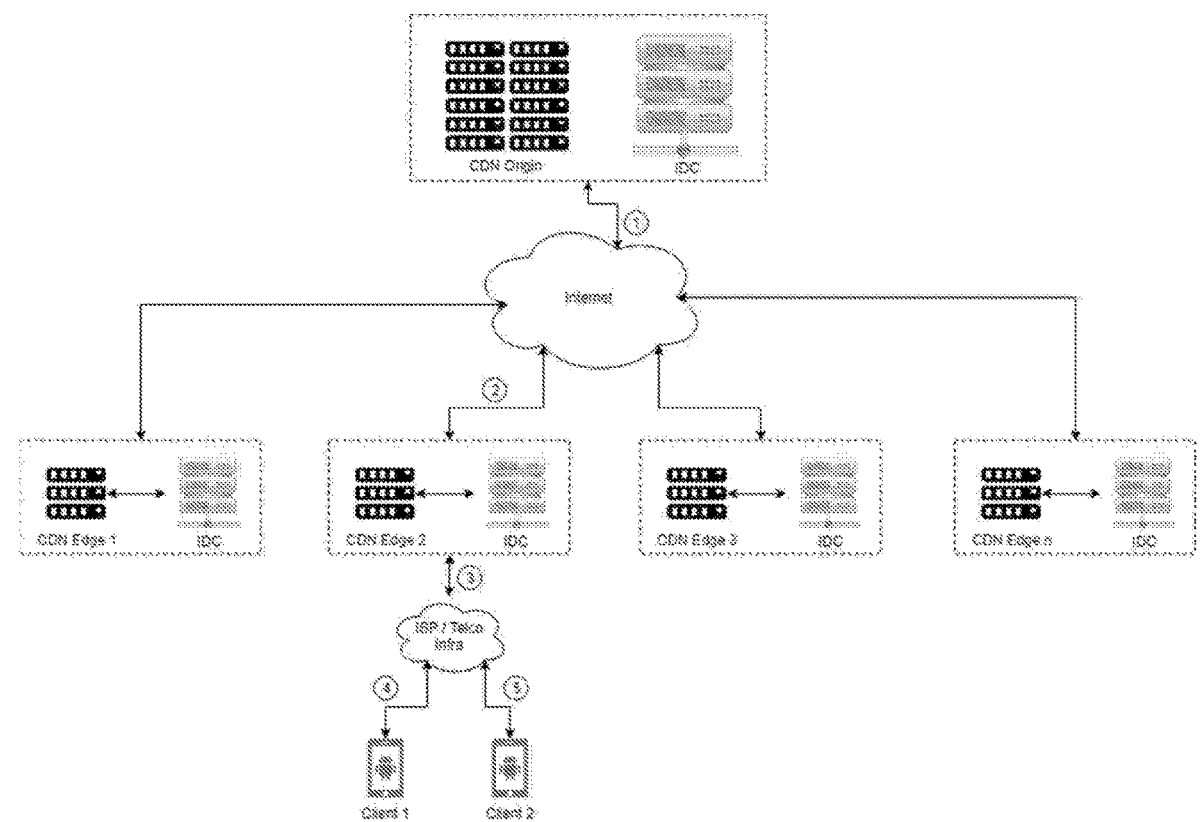
FIG. 2 illustrates how a conventional CDN operates
Figure 3:
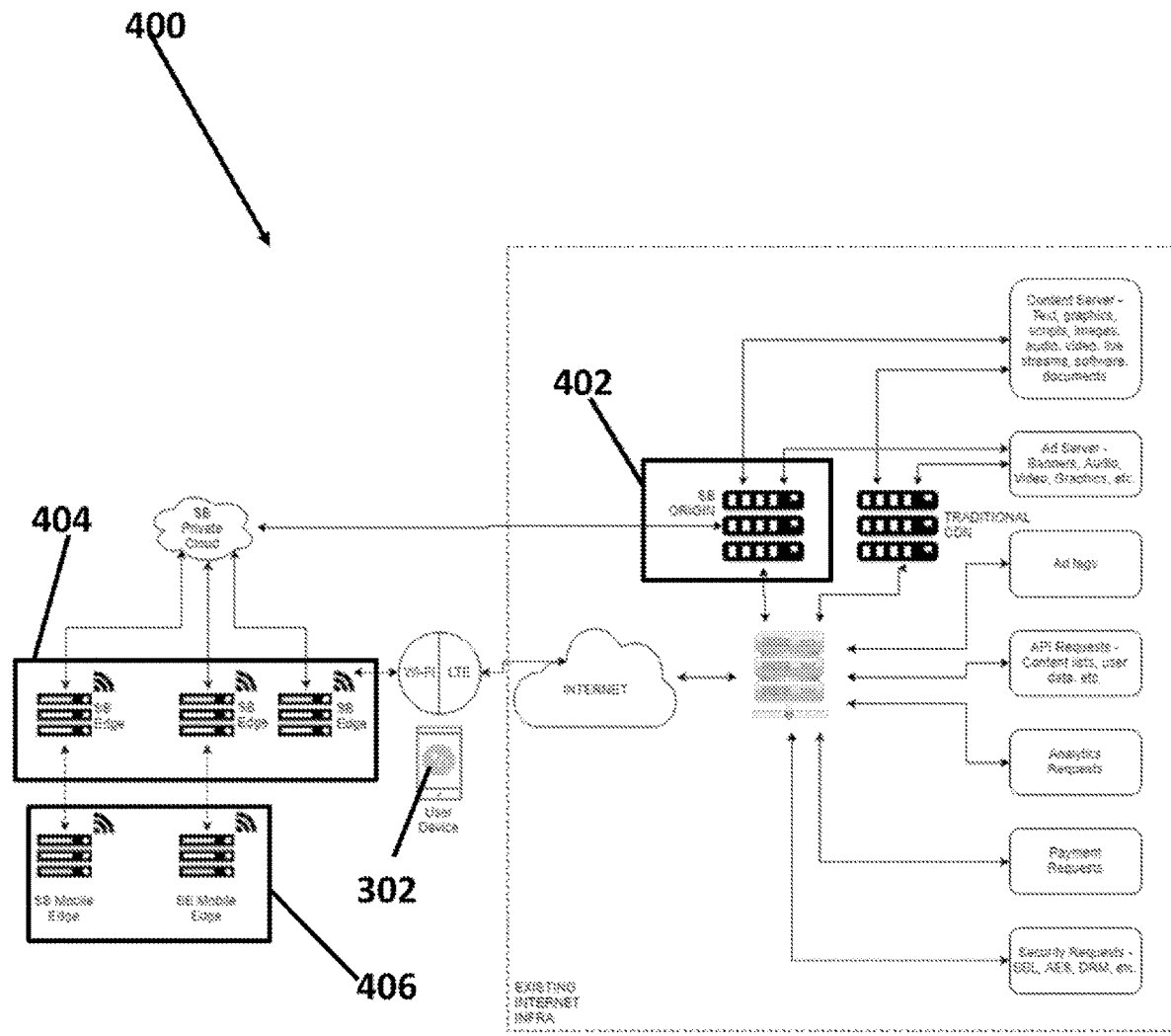
FIG. 3 illustrates how a digital service functions using the Internet Infrastructure, of which the conventional CDN is an integral part

FIG. 3 illustrates more details of the novel CDN system 300. The system 300 may further comprise one or more SugarBox pieces of hardware 402, 404, 406 that may be connected to the internet infrastructure at the internet data center and may also be coupled to each of the computing devices 302 over Wide Local Area Network (WLAN) that provides an additional communications path for each application request. Each SugarBox piece of hardware, known as a SugarBox CDN server, may be implemented as one or more server computers that are also equipped with a dedicated last mile over Wi-Fi at each CDN Edge which provides the following key functionalities:

The SugarBox CDN is connected to the existing internet infrastructure and acts as a complementary infrastructure to the internet. However, with the attached dedicated last mile over Wi-Fi, the data from the SugarBox CDN is delivered using a last mile which is outside the purview of the existing internet infrastructure (LAN) thereby:

Freeing up bandwidth on the existing internet infrastructure, especially on the last mile provided by Internet Service Providers/Telecom operators Doesn't load the existing internet infrastructure last mile with an increase in the number of users accessing or the consumption per user The SugarBox CDN enables a user that doesn't have access to the internet using any of the existing connectivity options (Internet Service Provider or Telecom operator) to experience whole or part of any Service The SugarBox CDN can continue to operate even when the connectivity of a CDN Edge server to the CDN Infrastructure is unavailable as the last mile can expose the data cached on the CDN Edge to the Service, thereby allowing access to the Service in an area without reliable and sustained connectivity (transport, remote locations, etc.)

The SugarBox CDN Edge is always one hop away from the user (as it is available to the user over a Local Area Network) than a traditional CDN Edge, thereby providing a faster data delivery and facilitating better user experience The SugarBox CDN uses a dedicated last mile, whereas the last mile in the existing internet infrastructure is a shared last mile for the CDN and all the other services running on the internet, thereby providing a faster data delivery and facilitating better user experience The SugarBox CDN operates on a last mile that operates on an unlicensed bandwidth, thereby making scalability of the last mile virtually unlimited, thereby enabling the Service to provide a guarantee to consumers on the availability, reliability and bandwidth availability while using the Service The SugarBox CDN Edge may be placed at Places of interest (Buses, Trains, Aircrafts, Malls, Commercial Centres, Airports, Cafes, Restaurants, Bars, Hotels, Educational Institutes, Hospitals, Clinics, Residential Complexes, Corporate Parks, Public Parks, Theme Parks, Public Places, etc.), which provides a service to make the experience contextual to the user based on the proximity of the user to a place of interest, without using the location of the device.

The SugarBox CDN optimizes and revolutionizes the way the internet works. The ecosystem ensures that a Service doesn't add to the load on to the existing internet infrastructure, irrespective of the number of users or the consumption per user, thereby making the internet more efficient.

In more detail, the novel CDN system 300 may have the following elements:

- SugarBox Origin & Mid Servers 402 which reside inside an Internet Data Center and are part of the existing internet infrastructure. These servers operate similarly to an origin server in a typical CDN.
- SugarBox Static Edge 404 which is connected to the SugarBox Origin using physical high speed connectivity (P2P/MPLS) and has an attached Wi-Fi setup exposed to the user
- SugarBox Mobile Edge 406 which from a hardware and software stack standpoint is the same as the SugarBox Static Edge, but instead of having physical connectivity to the SugarBox CDN Infrastructure, it is connected wirelessly using one of the two routes below:
  - Using MPLS/cellular data connectivity over a telecom network (may be intermittent and may not be high speed)
  - Using Wi-Fi and the corresponding physical connectivity from a SugarBox Edge (Is always intermittent when the Mobile Edge comes in the network of a Static Edge and is high speed)

Figure 4:
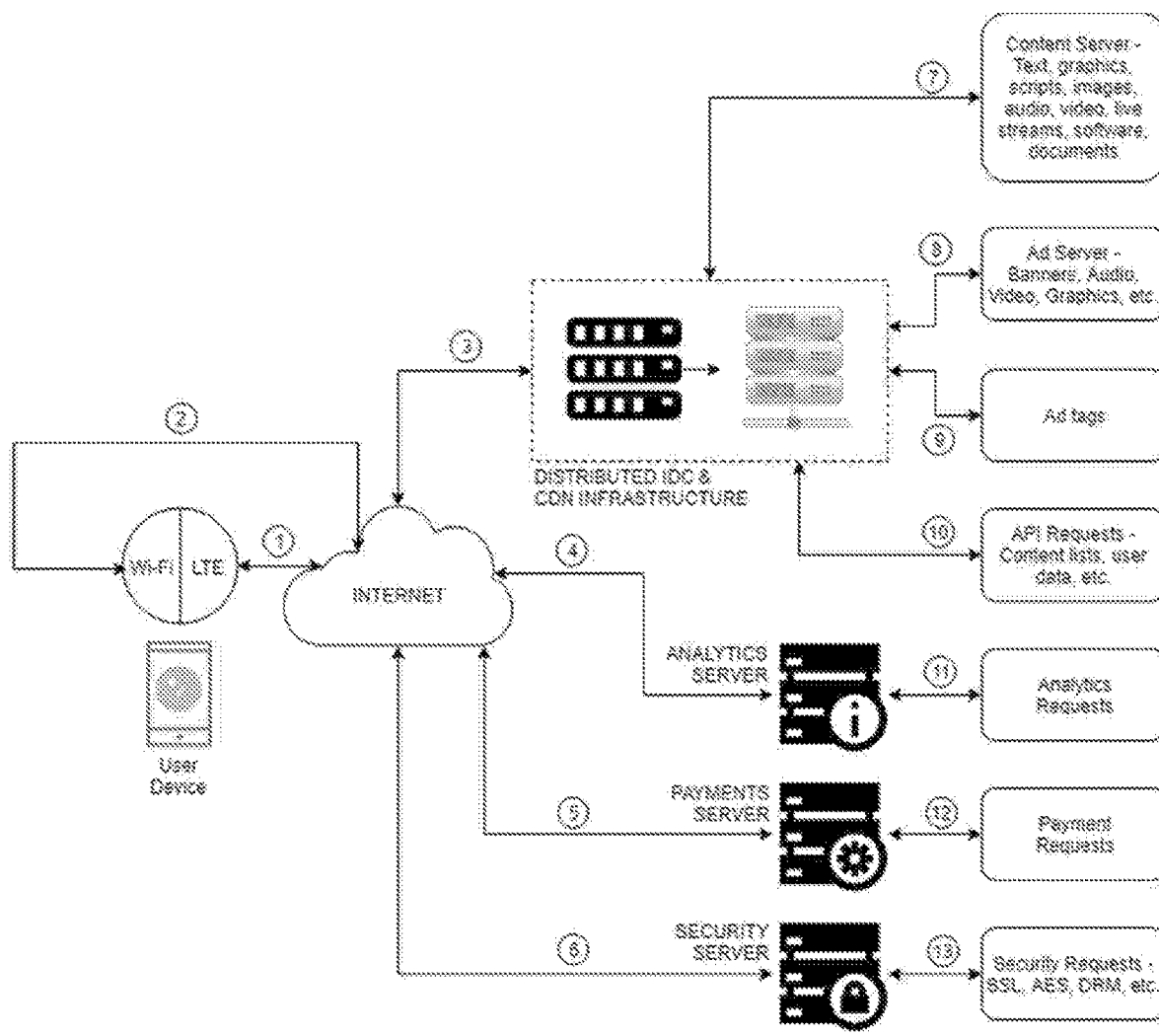
FIG. 4 illustrates a novel CDN system with CDN servers also deployed outside the Internet Infrastructure and having a last mile connected to the CDN servers

A Service requires access to the following 6 key elements to function:
- API Requests/HTTP Requests
- Security Requests—DRM/AES/SSL
- Analytics Requests
- Content Requests—Content/Downloadable Objects/Web Objects
- Ad Requests
- Payment Requests Generally, Analytics, Payments and Security requests are served directly by the Service Provider through their own/third party servers. All other requests are fronted by a CDN as shown in FIG. 4.

The SugarBox CDN works in the manner as detailed below:
- In the absence of the SugarBox CDN, the Service uses last mile connectivity (Internet service provider facility, either over ethernet or Wi-Fi, or a cellular data service) to access all requests
- When the user comes within the range of the Wi-Fi network of the SugarBox CDN Edge Server
  - The Service uses the user's cellular data connectivity to process all requests that are served directly by the Service Provider
  - The SugarBox CDN replaces the traditional CDN to process all requests that are fronted by the CDN The SugarBox Edge Server may support certain functionalities like DRM, Local payments, etc. which are served by the Edge Server locally.

In one example, the novel CDN system may be implemented in hardware and software in the following manner:
Summary of Hardware:
  SugarBox Origin & Mid
    Compute Servers
    Storage Servers
    Networking Equipment
  SugarBox Static & Mobile Edge
    Compute+Storage Server
    Networking Equipment
    Wi-Fi Equipment
Summary of Software Stack:
  SugarBox Origin & Mid
    Content Serving Software
    DNS
    DHCP
    Logging & Monitoring
    Databases
  SugarBox Static & Mobile
    Content Serving Software
    DNS
    DHCP
    Logging & Monitoring
    Databases How a Service Functions Using the Existing Internet Infrastructure:

To better understand the operation of the novel CDN and its elements, how a service functions today using the existing internet infrastructure and the traditional CDN is described with reference to FIG. 4. A Service needs a response for multiple types of requests to function. These requests are made over whatever connection the device has to the internet. By the nature of the requests, they could be either be cacheable by a CDN or not cacheable at all. The requests that are cacheable are cached via a CDN to ensure that the load on the server in the IDC is reduced and the request is served from the closest point to the subscriber, which optimizes the speed and cost of delivery.

The service works, using the existing internet infrastructure, in the following manner:
1. There is a cellular data connection (telecom last mile) of the users device to the internet
2. There is a WiFi connection (ISP last mile) of the users device to the internet.
3. The CDN Edge servers also have connectivity to the internet.
4. The servers accepting analytics requests also require connectivity to the internet
5. The servers accepting payment requests also require connectivity to the internet.
6. The servers serving the keys to decrypt content (DRM keys) also require connectivity to the internet.
7. The content, text, graphics etc. are served by servers in an Internet Data Center (IDC). The serving of these requests is usually fronted by a CDN with an appropriate Time To Live (TTL) for the particular piece of content. This is done to ensure that content is available closer to the consumption of the above content.
8. The serving of advertisements from a server in an IDC is also fronted by a CDN to ensure that the advertisement content is available closer to where it will get consumed.
9. The serving of 'Ad Tags' is fronted by CDN with a TTL to ensure fast delivery of the tag.
10. The response to API requests that are not specific to a user are cached in CDN with a TTL to ensure lower the load on the API server. The API requests that are specific to a user are either cached on the user device or delivered directly through the API server.

For the traditional CDN, a user is dependent on the availability of the last mile connectivity to access the internet through which a Service gets access to all requests to provide the user functionality and access to the Service. Also, the user and Service are dependent on the throughput available on the user's last mile connectivity and it's reliability which determines the user's experience of the Service.

Figure 5:
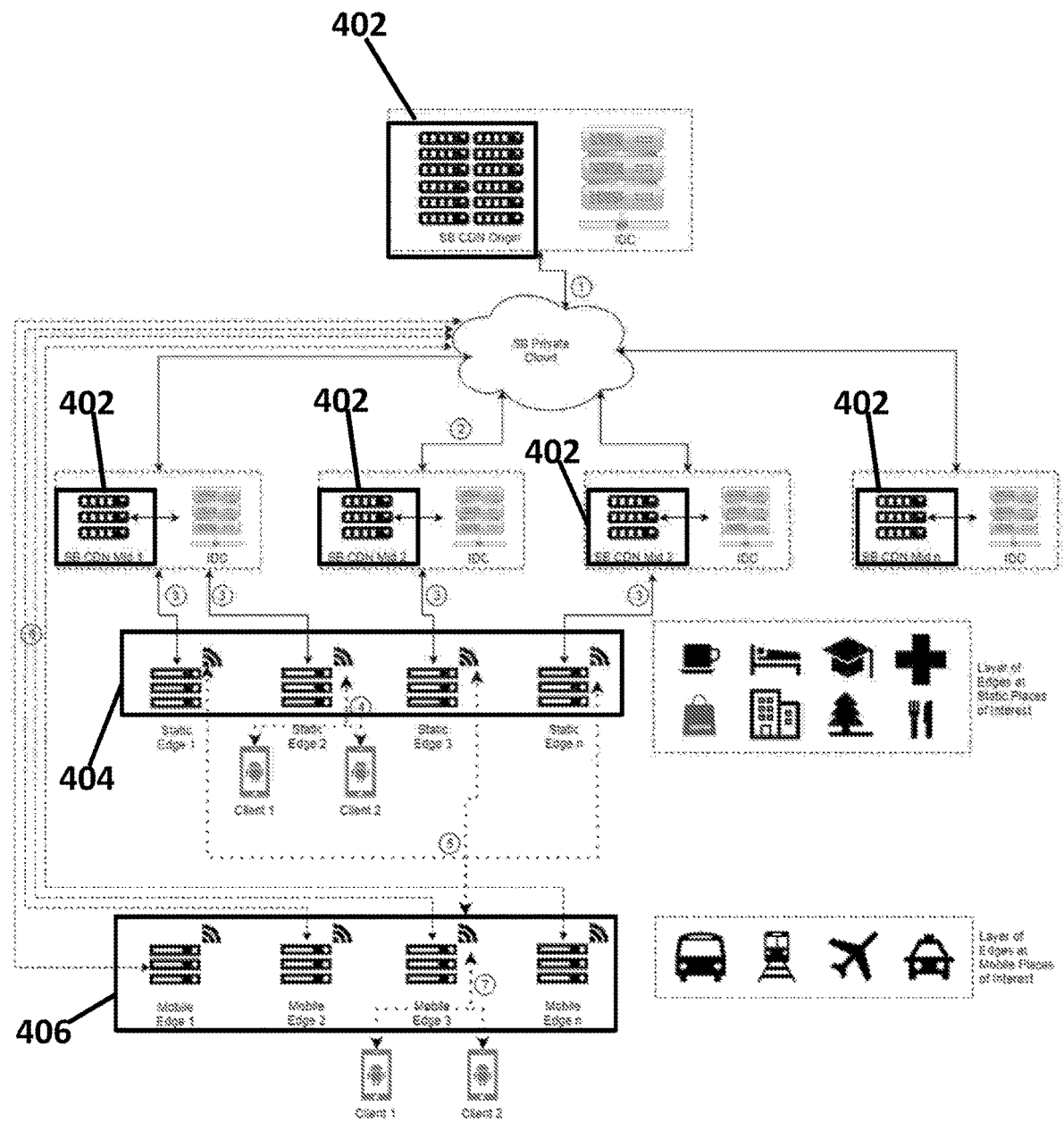
FIG. 5 illustrates the architecture and functionality of the novel CDN system

How SugarBox CDN Functions:

FIG. 5 illustrates how a service function using the novel CDN system and how the novel CDN functions. The SugarBox CDN is a multi-tiered CDN architecture with the SugarBox CDN Origin 402 forming the first tier, the SugarBox CDN Mid servers 402 forming the second tier and the SugarBox Edge servers 404 forming the third tier.

The SugarBox Edge Servers can be one of 2 types—Static or Mobile. A Static Edge server has wired high speed connectivity to the SugarBox CDN infrastructure. A Mobile Edge Server does not have wired high speed connectivity to the SugarBox CDN Infrastructure. Instead it gets intermittent high speed connectivity to the SugarBox CDN Infrastructure via a dedicated WiFi SSID at each Static Edge Server and also gets intermittent connectivity to the SugarBox Infrastructure (not necessarily high speed) using cellular data services offered by a telecom provider.

Unlike a regular CDN, which works on a pull based caching model, the SugarBox CDN works on a hybrid pull and push based model. A SugarBox Edge Server (Static & Mobile) may be collocated at a Place of Interest (POI) which is characterized by a specific user demographic and Service access patterns.

Based on the above, an Edge server within the SugarBox CDN can be instructed to get a list of content that it needs to cache. Whenever the Edge server has high speed connectivity to SugarBox CDN Infrastructure, the Edge Server starts downloading content from the previous tier and updating internal data structures to indicate that the content has been downloaded, and also update various other telemetry information. As each Edge Server starts serving data to users, the consumption data is fed to Machine learning algorithms to generate content lists based on the user demographics and Service access patterns at the Edge Server.

Figure 6:
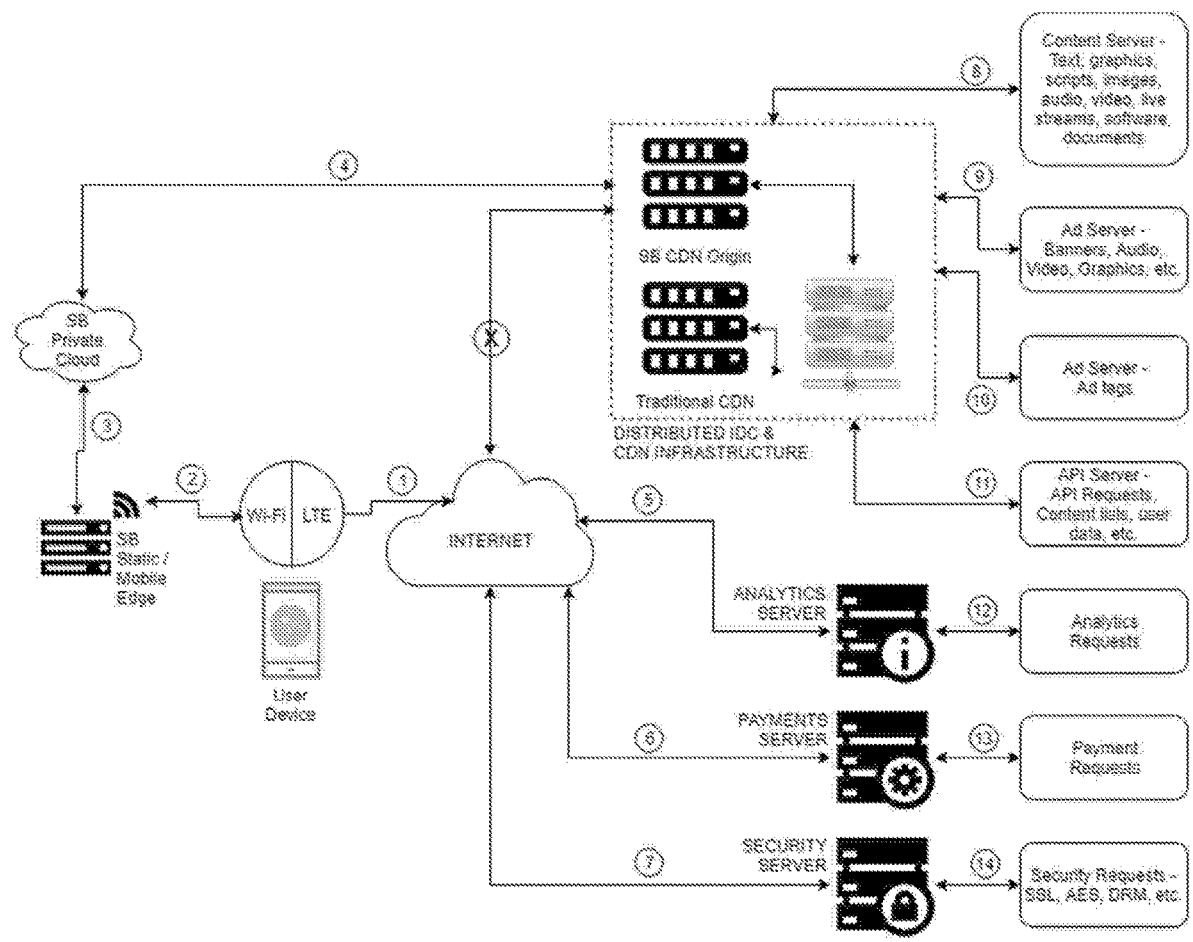
FIG. 6 illustrates how a digital service functions using the novel CDN system in a scenario similar to FIG. 5 (Both the CDN Servers and the user device have connectivity to the internet)

Each of the SugarBox Edge server also has a last mile over Wi-Fi, configured to cover the entire POI, which is used to serve content that is cached in the edge server to the subscriber. SugarBox CDN edge servers create a local network with self-contained DNS and DHCP services to enable the subscribers mobile devices to connect to SugarBox.
1. The SugarBox Origin is hosted inside an ISP/Telecom data center as shown in FIG. 5 and is connected to the existing internet infrastructure.
2. The SugarBox Mids are also hosted inside ISP/Telecom data centers and are connected to the existing internet infrastructure and the SugarBox Origin.
3. Each Static Edge Server has wired high speed connectivity to a SugarBox Mid
4. Each Static Edge Server also provides last mile connectivity over Wi-Fi, which a user connects to while using a Service
5. Each Static Edge Server also has a dedicated SSID which is used by other Mobile Edge Servers to connect to the Static Edge Server and utilize the high speed connectivity available at the Static Edge Server to communicate with the SugarBox CDN Infrastructure
6. Each Mobile Edge Server also has connectivity to the SugarBox CDN Infrastructure using a telecom operator's cellular data connection. However, this connectivity is intermittent and may not be high speed
7. Each Mobile Edge Server also provides last mile connectivity over Wi-Fi, which a user connects to while using a Service How a Service Works with SugarBox CDN:

When a subscriber launches a Service supported by the SugarBox CDN, while at a POI where a Static or Mid Edge Server is installed, the following 4 scenarios may exist:

Scenario 1—A User has Cellular Data and the SugarBox Edge Server Also has High Speed Connectivity to the SugarBox CDN Infrastructure (Shown in FIG. 6)

When both the Edge Server has connectivity to the SugarBox Infrastructure and the user has cellular data connectivity, the user's cellular data is used to process the Analytics and Payment requests. The Edge Server is also running a local DRM solution. For Security requests, the request is either served locally at the Edge Server or is served using the user's cellular data connectivity. All other requests are served by the Edge Server. If the subscriber requests content that is not present on the Edge server, the request is served like a traditional CDN with the content being cached at the Edge server and then served to the subscriber. This ensures that the subscriber is able to experience the complete service as it was intended to be experienced.

The service may function as follows:
1. The user is connected to the internet via cellular data
2. The user is simultaneously connected to the Edge Server using the last mile provided over Wi-Fi and a SSID which is exposed to the user of a Service supported by the SugarBox CDN
3. The Edge Server has high speed connectivity to the SugarBox Private Cloud
4. The SB CDN Origin/Mid has high speed access to the Edge Server through the SugarBox private cloud
5. The Service Provider's Analytics server is connected to the internet
6. The Service Provider's Payments server is connected to the internet
7. The Service Provider's Security server is connected to the internet
8. The SugarBox CDN Origin caches all the content from the Service Provider's Content Server
9. The SugarBox CDN Origin caches all the advertisements from the Service Provider's Ad Server
10. The SugarBox CDN Origin caches all the ad tags from the Service Provider's Ad Server
11. The SugarBox CDN Origin caches all non-user specific API requests from the Service Provider's API Server. For all user specific API requests, the SugarBox CDN Infrastructure only acts as a pipe to deliver data from the Service Provider's API Server to the user.

Figure 7:
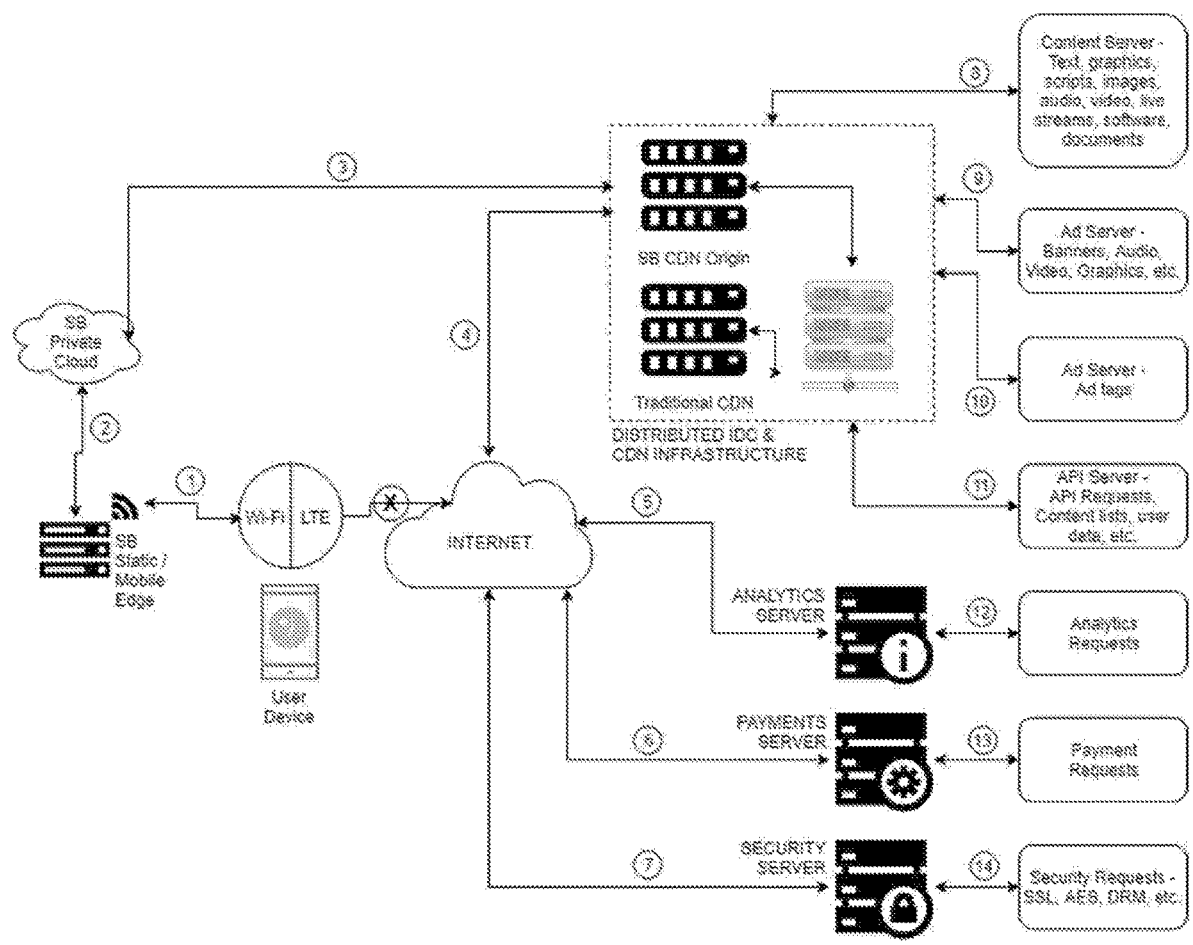
FIG. 7 illustrates how the novel CDN system works in a case where a conventional CDN system wouldn't. This illustration is for a case wherein the user device doesn't have connectivity to the internet, but the novel CDN system server does.

Scenario 2—A User Doesn't have Cellular Data, but the SugarBox Edge Server has High Speed Connectivity to the SugarBox CDN Infrastructure (Shown in FIG. 7)

In this case, everything works the same as that in Scenario 1 described above, except the following:
The SugarBox CDN Infrastructure acts as a pipe to deliver data from the Service Provider's Analytics Server to the user and vice versa.
The SugarBox CDN Infrastructure acts as a pipe to deliver data from the Service Provider's Payments Server to the user and vice versa.
For all Security requests which can't be fulfilled by the Edge Server locally, the SugarBox CDN Infrastructure acts as a pipe to deliver data from the Service Provider's Security Server to the user and vice versa.

Figure 8:
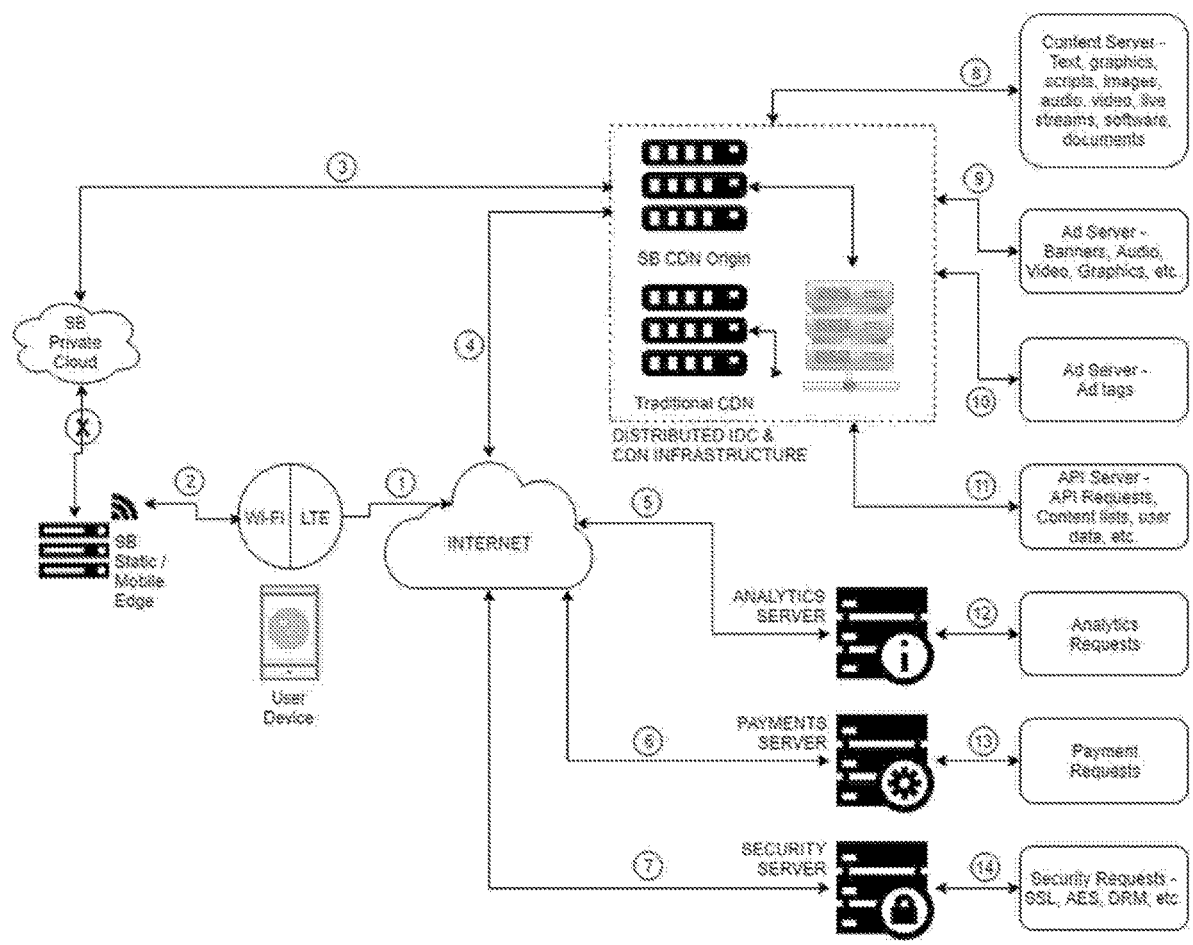
FIG. 8 illustrates how the novel CDN system works in a case where a conventional CDN system wouldn't. This illustration is for a case wherein the CDN server doesn't have connectivity to the internet, but the user device does.

Scenario 3—A User has Cellular Data, but the SugarBox Edge Server Doesn't have High Speed Connectivity to the SugarBox CDN Infrastructure (FIG. 8)

Figure 9:
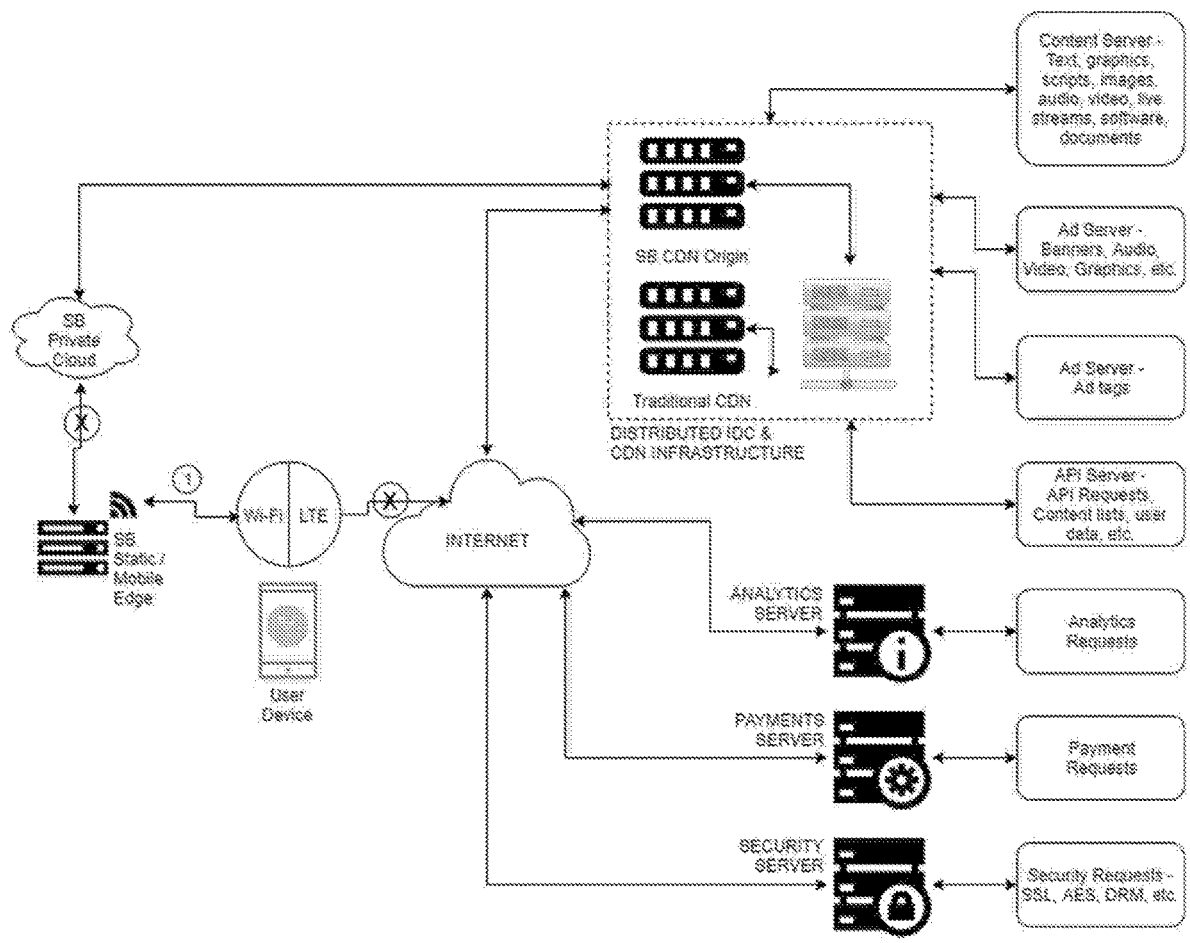
FIG. 9 illustrates how the novel CDN system works in a case where a conventional CDN system wouldn't. This illustration is for a case wherein both the CDN server and the user device don't have connectivity to the internet.

In this case, the Service works exactly the way it would in the absence of SugarBox, except the following:
All content requests that are cached on the SugarBox Edge Server are served using through the SugarBox All Ad and Ad tag requests that are cached on the SugarBox Edge Server are served through the SugarBox All non-user specific API requests that are cached on the SugarBox are served through the SugarBox All DRM/Security requests that can be generated locally at the SugarBox Edge Server are served through the SugarBox Scenario 4—A User Doesn't have Cellular Data and the SugarBox Edge Server Also Doesn't have High Speed Connectivity to the SugarBox CDN Infrastructure (FIG. 9)

This is the only case where the subscriber doesn't get access to the full functionality of the Service. However, even in this scenario, SugarBox CDN ensures that the user can continue using the service. Following are the limitations that a user will face in this case:

Only the APIs cached on the user device or cached on the SugarBox will be available to the user Only the Content cached on the user device or cached on the SugarBox will be available to the user Only the Ads cached on the SugarBox will be available to the user All Analytics requests will be buffered by the Service on the user device. This doesn't impact user functionality in any manner Only offline payment options (prepaid vouchers purchased at the POI by paying cash or offline credit card transactions, if supported) will be available to the user The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, OS library/ies, firmware, etc. found in general-purpose computers. In implementations where the innovations reside on a server, such a server may include or involve components such as software modules, OS library/ies, firmware, such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost. In addition to the implementations described above in which the settings/rules, code and configuration are implemented in the NCO in the application, the settings/rules, code and configuration may be implemented at the network level is network level elements that perform the same processes as described above.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A data delivery system, comprising:
a multi-tiered content delivery network having an origin server at a first tier, one or more mid servers at a second tier connected to the origin server and a plurality of edge servers at a third tier connected to the one or more mid servers and a plurality of computing devices that make requests to the multi-tiered content delivery network using a cellular data connection and a WiFi connection;
wherein each edge server has a processor and memory, is intermittently connected to the multi-tiered content delivery network and operates with and without connectivity to the multi-tiered content delivery network, wherein a particular edge server is physically located in a place of interest so that the particular edge server caches content based on user demographics and service access patterns associated with the place of interest;
the multi-tiered content delivery network capable of implementing a hybrid push and pull content model in which each edge server pulls content from the multi-tiered content delivery network for the place of interest and pushes the content, when requested by each computing device, to that computing device with and without access to the Internet; and
wherein the particular edge server is configured to generate a list of content based on user demographics and service access patterns associated with the place of interest, cache the content in the generated list of content and pull the pieces of content on the generated content list from the multi-tiered content delivery network for the place of interest.

2. The system of claim 1, wherein the plurality of edge servers further comprises a static edge server that has a Wi-Fi interface and a wired, high speed connection to the one or more mid servers.

3. The system of claim 2, wherein the plurality of edge servers further comprises a mobile edge server that connects to a static edge server over a Wi-Fi SSID for high speed communications and connects to the multi-tiered content delivery network using a wireless data network.

4. The system of claim 3, wherein each edge server has an attached Wi-Fi circuit covering the place of interest configured to deliver the content hosted by the edge server to a user at the place of interest over a Local Area Network (LAN).

5. The system of claim 1, wherein each edge server is configured to generate security keys, generate ad tags and generate API responses.

6. The system of claim 5, wherein each edge server is one hop away from the computing device thereby providing a faster data delivery and facilitating better user experience.

7. The system of claim 6, wherein the multi-tiered content delivery network uses a dedicated last mile that is not shared with other services running on the Internet thereby providing a faster data delivery and facilitating better user experience.

8. The system of claim 1, wherein the content delivered to each computing device by the particular edge server does not add load on the Internet Infrastructure or an Internet last mile of the multi-tiered content delivery network.

9. A method for accessing digital data, comprising:
providing a multi-tiered content delivery network having an origin server at a first tier, one or more mid servers at a second tier connected to the origin server and a plurality of edge servers at a third tier connected to the one or more mid servers and a plurality of computing devices that make requests to the multi-tiered content delivery network using a cellular data connection and a WiFi connection wherein each edge server is intermittently connected to the multi-tiered content delivery network and a particular edge server is physically located in a place of interest so that the particular edge server caches content based on user demographics and service access patterns associated with the place of interest;
performing a hybrid push and pull content delivery model in which each edge server pulls content from the multi-tiered content delivery network for the place of interest and pushes the content, with and without connectivity to the multi-tiered content delivery network, when requested by each computing device, to that computing device with and without access to the Internet;
generating, at each edge server, a list of content based on user demographics and service access patterns associated with the place of interest; and
caching, at each edge server, the content in the generated list of content by pulling the pieces of content on the generated content list from the multi-tiered content delivery network for the place of interest.

10. The method of claim 9 further comprising providing a static edge server that has a Wi-Fi interface and a wired, high speed connection to the one or more mid servers.

11. The method of claim 10 further comprising providing a mobile edge server that connects to a static edge server over a Wi-Fi S SID for high speed communications and also connects to the multi-tiered content delivery network infrastructure over a wireless data network.

12. The method of claim 11 further comprising covering, by each edge server having an attached WiFi circuit, the place of interest configured to deliver the content hosted by the edge server to a user at the place of interest over a Local Area Network (LAN).

13. The method of claim 9 further comprising using, by the multi-tiered content delivery network, a dedicated last mile that is not shared with other services running on the Internet thereby providing a faster data delivery and facilitating better user experience.

14. The method of claim 9, wherein the content delivered to each computing device by the particular edge server does not add load on the Internet Infrastructure or an Internet last mile of the multi-tiered content delivery network.

\* \* \* \* \*